Jan. 19, 1926.  
F. L. LANE  
1,570,356  
LUBRICATING APPLIANCE  
Filed June 3, 1922

Witness:  
A. J. Sauser

Inventor:  
Franklin L. Lane  
By Walter M. Fuller  
City.

Patented Jan. 19, 1926.

1,570,356

UNITED STATES PATENT OFFICE.

FRANKLIN L. LANE, OF BELOIT, WISCONSIN, ASSIGNOR TO P. B. YATES MACHINE COMPANY, OF BELOIT, WISCONSIN, A CORPORATION OF WISCONSIN.

LUBRICATING APPLIANCE.

Application filed June 3, 1922. Serial No. 565,771.

*To all whom it may concern:*

Be it known that I, FRANKLIN L. LANE, a citizen of the United States, residing at Beloit, in the county of Rock and State of Wisconsin, have invented certain new and useful Improvements in Lubricating Appliances, of which the following is a specification.

The present invention concerns new features of construction in means for circulating a lubricating medium whereby it will be fed with certainty and in adequate quantity to the bearings of a machine, more especially, but not exclusively, one of relatively high speed, such as an electric-motor, and the shaft which it revolves.

The leading aim and prime purpose of this invention is the provision of a simple but effective centrifugal pump mechanism for causing the desired flow of the oil to the parts of the machine requiring a supply of such lubricant.

A further object of the invention is the production of such a pumping appliance which may be easily associated with the main machine to be supplied with the lubricant, and which will operate efficiently and without danger of interruption of the required service and without likelihood of damage to the circulating system itself.

To enable those skilled in this art to fully understand the invention and its structural and functional advantages, I have illustrated a desirable and preferred embodiment thereof on the accompanying drawing and have shown the same in connection with an electric-motor.

In this drawing:—

Figure 1:
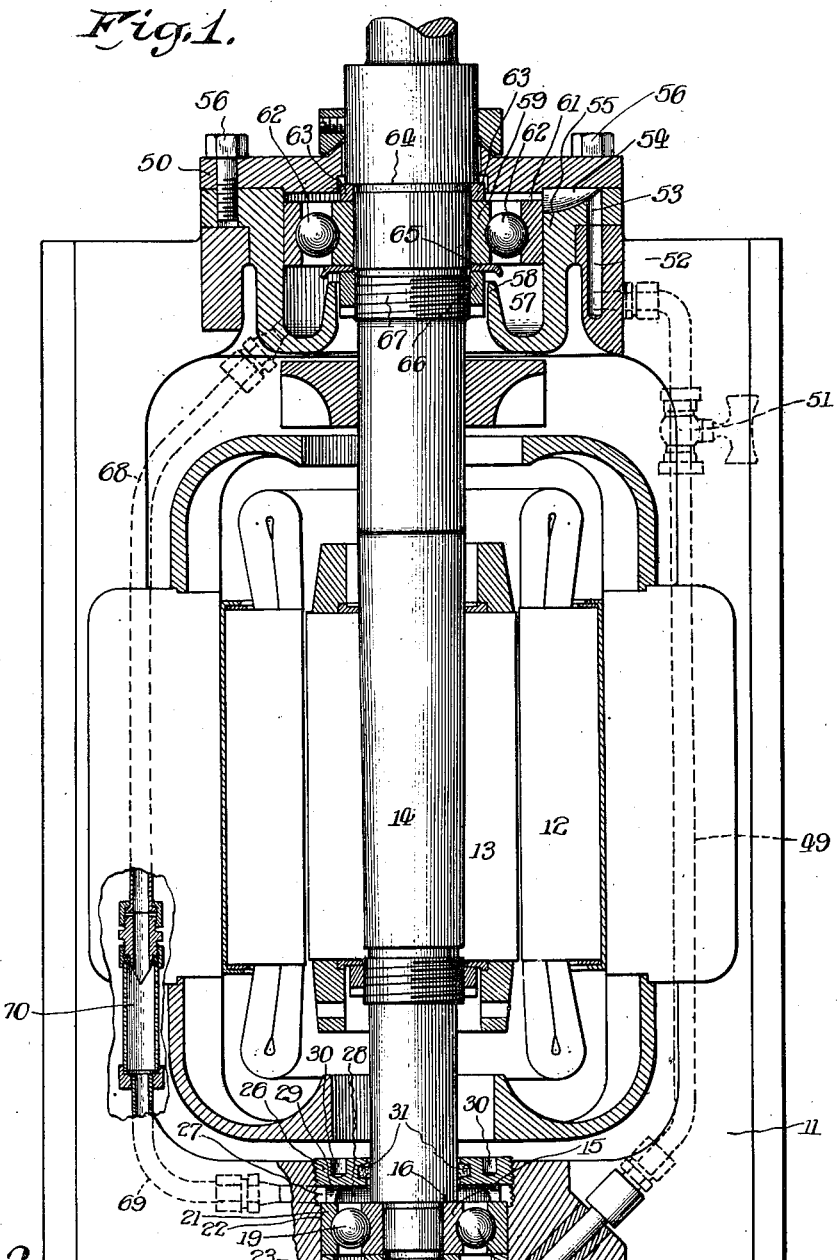
Figure 2:
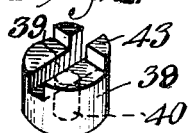

Fig. 1 illustrates partly in section and partly somewhat diagrammatically a simple form of the structure referred to; and Fig. 2 is a perspective view of a plug used at the lower end of the appliance, the same being shown inverted.

Referring to this illustration, it will be perceived that the motor is mounted on a yoke 11 and comprises a stator 12 and a rotor 13 on an upright shaft 14.

The inner ball race 15 of the lower ball-bearing is held on the shaft between a shoulder 16 thereon and a nut 17 screwed on the threaded reduced diameter part 18 of the shaft.

The balls 19 of such bearing coact also with an outer ball-race 21 held stationary in a vertical aperture 22 through the lower part of the yoke, such element 21 resting on an upstanding, circular flange 23 of a cap 24 fastened to the bottom of the yoke by a number of screws 25.

Above and bearing on the top of the member 21, I employ a ring-nut 26 screwed into the threaded upper portion of the aperture 22, the lower face of such nut having an external, peripheral channel 27 and an internal channel 28 connected together at intervals by radial passages 29.

Nut 26 has holes 30 for the application of a spanner-wrench, whereby such element may be turned down or unscrewed, and it is also fitted inside with a groove 31 containing a lubricant-retaining packing cooperating with the shaft.

The downwardly-extended, central boss 32 of the cap 24 has a vertical, cylindrical passage 33 therethrough accommodating a sleeve or bearing 34 for the lower end portion 35 of the shaft, the latter at its lower terminal portion having an inclined passage 36 opening at its lower end through the center of the bottom end of the shaft and at its upper end through the side of the shaft and in register with an annular channel 37 in the inner face of the sleeve 34.

Beneath and bearing on the lower end of the shaft I employ a stationary, cylindrical plug 38 having a cross groove 39 on its under face, and a central, vertical hole 40 communicating with the passage 36.

A bent leaf-spring 41 has one end fastened at 42 against the outer face of the boss and the lower horizontal part of such spring is beneath and presses upwardly on the lower end of the plug without closing the groove 39 and its connection with the passage 40.

To prevent the plug from rotating with the rapidly-revolving shaft against which it bears, the end of the spring coacts with the vertical surface of transverse lugs 43 on the under face of the plug.

A screen 44 fastened to the exterior of the boss in any approved fashion encloses the lower portion of the latter and the parts already described carried thereby.

Another cap 45 fastened to the yoke by suitable screws 46 encases the other cap and acts as an oil-well or sump, and in order that the oil may drain from the oil-chamber of the inner cap into the outer cap, the former has a plurality of discharge openings or ports 47.

Channel 37 connects with a hole 48 (inclined in the present instance) in the boss and this in turn is in connection with an upwardly-extended pipe 49 fitted with a regulating stop-cock 51, the pipe beyond the cock communicating with a vertical passage 52 in the yoke, the latter passage at its top end delivering into an aligned upright hole 53 and a radial groove 54 in a top oil-well member 55 permitting the pumped oil to be delivered to an upper ball-bearing about to be described.

Element 55, equipped with a cover 50 secured thereto by screws 56, has an outstanding flange resting on the top of the yoke and a depending annular oil-chamber part 57 of the member 55 has an upstanding circular flange 58 surrounding the shaft.

A ball-bearing comprises internal and external ball-races 59 and 61 and interposed balls 62, the inner ball-track being retained in position between a collar 63 bearing on a shoulder 64 of the shaft and an oil deflector 65 held against the bottom of the ball-race by a nut 66 on the threaded part 67 of the shaft.

The element 65 having a downwardly-directed marginal flange extends outwardly well over the round or circular wall 58 whereby the oil delivered to and flowing down through the ball-bearing is caused to enter the compartment or chamber 57 without danger of leakage down the shaft.

The oil in chamber 57 is delivered through a pipe 68 to a sight-drip 70 of any appropriate design and from the latter through a pipe 69 to the channel 27 from which it flows through the grooves 29 into the inner channel 28 and thence down through the lower ball-bearing into the inner and outer cups or caps respectively.

The high speed of rotation of the shaft causes the centrifugal discharge of the oil in the shaft passage 36 uninterruptedly into the surrounding annular chamber 37 forcing the oil out under pressure continuously from the latter through the conduit system 48, 49, 51, 52, 53, 54, ball-bearing 62, 57, 68, 70, 69, 27, 29, 28, ball-bearing 19, oil-chamber in element 24, 47, oil-well in part 45, and screen 44.

Such centrifugal delivery or feed of the oil causes a flow or intake of the oil in the sump through passages 39 and 40 into the pump orifice 36 from which it is discharged under pressure to traverse the cycle or system specified.

The regulating or governing valve 51 is designed to permit control of the oil flow as seen in the appliance 70 to prevent the cup below the upper bearing from overflowing, but enabling adequate lubricant to be pumped to such bearing from which it flows down and oils the lower bearing, all as will be readily understood.

Clearly, the invention, as defined by the appended claims, is not confined or restricted to the particular embodiment thereof described in detail above and illustrated, but is susceptible of several embodiments varying from one another more or less in mechanical details but all incorporating the fundamental principles of construction and operation upon which the invention is based.

I claim:

1. In a lubricating system of the character described, the combination of a shaft having an open-ended passage extended outwardly from an end of the shaft through a side thereof, whereby to discharge its contents under the action of centrifugal force, a bearing for said shaft, a stationary member bearing on the end of said shaft and having a channel therethrough communicating with said shaft passage, means to supply lubricant to said channel, a spring pressing said member against the end of said shaft, and means to conduct the lubricant expelled from said shaft passage to said shaft bearing.

2. In a lubricating system of the character described, the combination of an upright revoluble shaft having an open-ended pump passage extended from its lower end to the side thereof whereby to expel its contents under the action of centrifugal force, a bearing for said shaft, a sleeve encasing the part of the shaft equipped with said pump passage, a plug in said sleeve bearing on the lower end of said shaft and having a channel communicating with said shaft pump passage, means to conduct lubricant to said plug channel, means to maintain said plug stationary, and means to conduct the pumped lubricant to said bearing.

3. In a lubricant system of the character described, the combination of an upright revoluble shaft having an open-ended pump passage extended from its lower end to the side thereof whereby to expel its contents under the action of centrifugal force, a bearing for said shaft, a sleeve encasing the part of the shaft equipped with said pump passage and having an internal annular channel in register with the end of said shaft passage at the side of the shaft, a plug in said sleeve bearing on the lower end of said shaft and having a channel communicating with said shaft pump passage, means to conduct lubricant to said plug channel, means to maintain said plug stationary, and means to conduct the pumped lubricant from said sleeve channel to said bearing.

4. In a lubricating system of the character described, the combination of an upright revoluble shaft having an open-ended pump passage extended from its lower end to the side thereof whereby to expel its contents under the action of centrifugal force, a bearing for said shaft, a sleeve encasing the part of the shaft equipped with said pump passage and having an internal annular channel in register with the end of said shaft passage at the side of the shaft, a plug in said sleeve bearing on the lower end of said shaft and having a channel communicating with said shaft pump passage, means to conduct lubricant to said plug channel, a spring pressing said plug upwardly against the lower end of said shaft, said plug having means co-operating with said spring to maintain said plug stationary, and means to conduct the pumped lubricant from said sleeve channel to said bearing.

In witness whereof I have hereunto set my hand and seal.

FRANKLIN L. LANE. [L. S.]